(12) United States Patent
Drobychev et al.

(10) Patent No.: US 8,341,118 B2
(45) Date of Patent: Dec. 25, 2012

(54) METHOD AND SYSTEM FOR DYNAMICALLY REPLICATING DATA WITHIN A DISTRIBUTED STORAGE SYSTEM

(75) Inventors: Alexandre Drobychev, San Jose, CA (US); Alexander Kesselman, Sunnyvale, CA (US); Rebekah C. Vickrey, Mountain View, CA (US); Frank C. Dachille, Mountain View, CA (US); George Datuashvili, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/022,579

(22) Filed: Feb. 7, 2011

(65) Prior Publication Data

US 2011/0196828 A1    Aug. 11, 2011

Related U.S. Application Data

(60) Provisional application No. 61/302,896, filed on Feb. 9, 2010.

(51) Int. Cl.
*G06F 17/30*    (2006.01)
(52) U.S. Cl. .................. 707/636; 707/635; 707/626
(58) Field of Classification Search .................. None
See application file for complete search history.

(56) References Cited

U.S. PATENT DOCUMENTS

| | | | |
|---|---|---|---|
| 6,167,427 A * | 12/2000 | Rabinovich et al. .......... 709/201 |
| 6,728,751 B1 | 4/2004 | Cato et al. |
| 6,857,012 B2 | 2/2005 | Sim et al. |
| 7,107,419 B1 | 9/2006 | Ghemawat et al. |
| 7,251,670 B1 | 7/2007 | Day |
| 7,293,154 B1 | 11/2007 | Karr et al. |
| 7,320,059 B1 | 1/2008 | Armangau et al. |
| 7,450,503 B1 | 11/2008 | Ginjpalli et al. |
| 7,558,927 B2 | 7/2009 | Clark et al. |
| 7,567,973 B1 | 7/2009 | Burrows et al. |
| 7,647,329 B1 | 1/2010 | Fischman et al. |
| 7,653,668 B1 | 1/2010 | Shelat et al. |

(Continued)

FOREIGN PATENT DOCUMENTS

EP    1 860 542 A2    11/2007

OTHER PUBLICATIONS

Google Inc., PCT/US2011/024246, Feb. 9, 2011, International Search Report and Written Opinion mailed Apr. 26, 2011, 9 pgs.

(Continued)

*Primary Examiner* — Debbie Le
(74) *Attorney, Agent, or Firm* — Morgan, Lewis & Bockius LLP

(57) ABSTRACT

A server computer at a first storage sub-system of a distributed storage system receives from a client a first client request for an object. If the object is not present in the first storage sub-system, the server computer identifies a second storage sub-system of the distributed storage system as having a replica of the requested object, the requested object including content and metadata. The server computer submits an object replication request for the requested object to the second storage sub-system and independently receives the content and metadata of the requested object from the second storage sub-system. The server computer generates a new replica of the object at the first storage sub-system using the received metadata and content and returns the metadata of the new replica of the object to the client.

20 Claims, 14 Drawing Sheets

U.S. PATENT DOCUMENTS

| | | | |
|---|---|---|---|
| 7,660,836 B2 | 2/2010 | Bolik et al. | |
| 7,716,171 B2 | 5/2010 | Kryger | |
| 7,761,678 B1 | 7/2010 | Bodmer et al. | |
| 7,778,972 B1* | 8/2010 | Cormie et al. | 707/626 |
| 7,778,984 B2* | 8/2010 | Zhang et al. | 707/696 |
| 7,885,928 B2 | 2/2011 | Harrington et al. | |
| 8,010,514 B2* | 8/2011 | Zhang et al. | 707/696 |
| 8,099,388 B2 | 1/2012 | Shen et al. | |
| 2002/0147774 A1* | 10/2002 | Lisiecki et al. | 709/203 |
| 2003/0149709 A1 | 8/2003 | Banks | |
| 2004/0199810 A1 | 10/2004 | Tarcea et al. | |
| 2005/0198359 A1 | 9/2005 | Basani et al. | |
| 2006/0026219 A1* | 2/2006 | Orenstein et al. | 707/204 |
| 2006/0112140 A1 | 5/2006 | McBride et al. | |
| 2006/0221190 A1 | 10/2006 | Limberis et al. | |
| 2007/0050415 A1 | 3/2007 | Armangau et al. | |
| 2007/0078901 A1 | 4/2007 | Satou et al. | |
| 2007/0156842 A1 | 7/2007 | Vermeulen et al. | |
| 2007/0203910 A1* | 8/2007 | Ferguson et al. | 707/8 |
| 2007/0283017 A1 | 12/2007 | Anand et al. | |
| 2008/0027884 A1 | 1/2008 | Boutault | |
| 2008/0147821 A1 | 6/2008 | Dietrich et al. | |
| 2009/0083342 A1 | 3/2009 | Tomic et al. | |
| 2009/0083563 A1 | 3/2009 | Murase | |
| 2009/0228532 A1 | 9/2009 | Anzai | |
| 2009/0240664 A1* | 9/2009 | Dinker et al. | 707/3 |
| 2009/0265519 A1 | 10/2009 | Moore et al. | |
| 2009/0271412 A1 | 10/2009 | Lacapra et al. | |
| 2009/0276408 A1 | 11/2009 | Auerbach et al. | |
| 2009/0327602 A1 | 12/2009 | Moore et al. | |
| 2010/0017037 A1* | 1/2010 | Nam et al. | 700/275 |
| 2010/0094981 A1 | 4/2010 | Cordray et al. | |
| 2010/0138495 A1 | 6/2010 | McIntyre et al. | |
| 2010/0189262 A1 | 7/2010 | Ducharme et al. | |
| 2010/0325476 A1* | 12/2010 | Zhang et al. | 714/4 |
| 2011/0185013 A1 | 7/2011 | Obata et al. | |
| 2011/0238625 A1 | 9/2011 | Hamaguchi et al. | |

OTHER PUBLICATIONS

Google Inc., PCT/US2011/024247, Feb. 9, 2011, International Search Report and Written Opinion mailed Sep. 23, 2011, 15 pgs.

Google Inc., PCT/US2011/024249, Feb. 9, 2011, International Search Report and Written Opinion mailed Apr. 26, 2011, 10 pgs.

Chang et al., "Bigtable: A Distributed Storage System for Structured Data," OSDI, Oct. 31, 2006, 1-14 pgs.

Ghemawat et al., "The Google File System," SOSP' 03, Oct. 19-22, 2003, 15 pgs.

Google Code, "Protocol Buffers Language Guide," Jul. 11, 2008, 16 pgs. http://code.google.com/apis/protocolbuffers/docs/proto.html.

Korn et al., "The VCDIFF Generic Differencing and Compression Data Format," RFC 3284, Jun. 2002, 1-29 pgs.

Barrett, How Index Building Works, Google Code, Nov. 24, 2008, 3 pgs.

* cited by examiner

Server Allocation

| Task / Function | Typical Number of Servers at an Instance |
|---|---|
| Blobmaster | 10 |
| Bitpusher | 100 |
| BigTable Servers | 50 |
| File System Servers | 1000 |
| Tape Servers | 10 |
| Tape Master | 5 |
| Replication Management | 10 |
| Quorum Clock Server | 5 |

METHOD AND SYSTEM FOR DYNAMICALLY REPLICATING DATA WITHIN A DISTRIBUTED STORAGE SYSTEM

PRIORITY

This application claims priority to U.S. Provisional Application Ser. No. 61/302,896, filed Feb. 9, 2010, entitled "Method and System for Dynamically Replicating Data Within a Distributed Storage System", which is incorporated by reference herein in its entirety.

TECHNICAL FIELD

The disclosed embodiments relate generally to database replication, and more specifically to dynamic replication of data between two storage sub-systems of a distributed storage system.

BACKGROUND

For weakly mutable data, changes or mutations at one instance (or replica) of the data must ultimately replicate to all other instances of the database, but there is no strict time limit on when the updates must occur. This is an appropriate model for certain data that does not change often, particular when there are many instances of the database at locations distributed around the globe.

Replication of large quantities of data on a planetary scale can be both slow and inefficient. In particular, the long-haul network paths have limited bandwidth. In general, a single change to a large piece of data entails transmitting that large piece of data through the limited bandwidth of the network. Furthermore, the same large piece of data is transmitted to each of the database instances, which multiplies the bandwidth usage by the number of database instances.

In addition, network paths and data centers sometimes fail or become unavailable for periods of time (both unexpected outages as well as planned outages for upgrades, etc.). Generally, replicated systems do not handle such outages gracefully, often requiring manual intervention. When replication is based on a static network topology and certain links become unavailable or more limited, replication strategies based on the original static network may be inefficient or ineffective.

By definition, data stored within a distributed storage system are not at a single location but distributed across a geographical region or even the whole world. Therefore it is a challenge to design an optimized real-time data replication scheme within a large distributed storage system such that the scheme not only consumes as little resource as possible but also improves the services offered by the distributed storage system.

SUMMARY

The above deficiencies and other problems associated with replicating data for a distributed database to multiple replicas across a widespread distributed system are addressed by the disclosed embodiments. In some of the disclosed embodiments, changes to an individual piece of data are tracked as deltas, and the deltas are transmitted to other instances of the database rather than transmitting the piece of data itself. In some embodiments, reading the data includes reading both an underlying value and any subsequent deltas, and thus a client reading the data sees the updated value even if the deltas has not been incorporated into the underlying data value. In some embodiments, distribution of the data to other instances takes advantage of the network tree structure to reduce the amount of data transmitted across the long-haul links in the network. For example, data that needs to be transmitted from Los Angeles to both Paris and Frankfurt could be transmitted to Paris, with a subsequent transmission from Paris to Frankfurt.

In accordance with some embodiments, a computer-implemented method for replicating objects within a distributed storage system is implemented at one or more server computers, each having one or more processors and memory. The memory stores one or more programs for execution by the one or more processors on each server computer, which is associated with a distributed storage system that includes a plurality of storage sub-systems.

A server computer at a first storage sub-system receives from a client a first client request for an object. If the object is not present in the first storage sub-system, the server computer identifies a second storage sub-system as having a replica of the requested object, the requested object including content and metadata. The server computer submits an object replication request for the requested object to the second storage sub-system and independently receives the content and metadata of the requested object from the second storage sub-system. The server computer generates a new replica of the object at the first storage sub-system using the received metadata and content and returns the metadata of the new replica of the object to the client.

In some embodiments, upon receipt of the first client request, the server computer extracts an object ID of the requested object from the first client request, queries a metadata table of the first storage sub-system using the object ID, and determines whether the object is present in the first storage sub-system in accordance with the query result.

In some embodiments, the server computer identifies a second storage sub-system by sending a query for the requested object to a third storage sub-system and receives a response from the third storage sub-system. The third storage sub-system includes metadata of objects stored at the plurality of storage sub-systems. The response from the third storage sub-system identifies the second storage sub-system as source and a chunk store within the first storage sub-system as destination.

In some embodiments, the server computer submits an object replication request for the requested object to the second storage sub-system by submitting a metadata replication request to a metadata management component of the second storage sub-system. The metadata replication request includes an identifier of the requested object. Upon receipt of the metadata of the requested object from the metadata management component of the second storage sub-system, the server computer identifies a location of the object content at the second storage sub-system using an extents table of the requested object and submits a content replication request to a content management component of the second storage sub-system, the content replication request including the identified content location of the requested object. In some embodiments, the content replication request is given a priority higher than other content replication requests that are not triggered by a real-time client request.

In some embodiments, upon receipt of the metadata of the requested object, the server computer generates a metadata entry for the object in a metadata table of the first storage sub-system and inserts the received metadata into the newly-generated metadata entry of the metadata table. For the newly-generated metadata entry, the server computer sets an object state attribute in the newly-generated metadata entry as "uploading" and returns the newly-generated metadata entry to the requesting client.

In some embodiments, the server computer receives from the client a second client request for accessing a client-specified portion of the object. For each chunk of the object received from the second storage system, the server returns the chunk to the requesting client if the chunk overlaps with the client-specified portion of the object. Additionally, the server computer stores a replica of the chunk within the first storage sub-system and updates the metadata entry in the first storage sub-system to reflect the presence of the chunk within the first storage sub-system.

In some embodiments, the server computer updates the metadata entry in the first storage sub-system by generating a metadata update for each received chunk, the metadata update including location information of the chunk within the first storage sub-system, and updates an extents table of the metadata entry using the location information of the chunk. The server computer updates the object state attribute of the metadata entry to be "finalized" if the plurality of chunks of the object are located within one chunk store of the first storage sub-system and updates the object state attribute of the metadata entry to be "finalizing" if the plurality of chunks of the object are located within multiple chunk stores of the first storage sub-system.

In some embodiments, the server computer moves the plurality of chunks from the multiple chunk stores of the first storage sub-system to a destination chunk store of the first storage sub-system and updates the object state attribute of the metadata entry to be "finalized" if the plurality of chunks of the object are located within the destination chunk store of the first storage sub-system.

In accordance with some embodiments, a distributed storage system is comprised of one or more computer systems, each computer system including one or more processors; and memory for storing one or more programs. The one or more processors are configured to execute at a first storage sub-system the one or more programs including instructions for: receiving from a client a first client request for an object that is not present in the first storage sub-system; identifying a second storage sub-system as having a replica of the requested object, wherein the requested object includes content and metadata; submitting an object replication request for the requested object to the second storage sub-system; and independently receiving the content and metadata of the requested object from the second storage sub-system; generating a new replica of the object at the first storage sub-system using the received metadata and content; and returning the metadata of the new replica of the object to the client.

Thus methods and systems are provided that make replication of data in distributed databases faster, and enable more efficient use of network resources. Faster replication results in providing users with updated information (or access to information) more quickly; and more efficient usage of network bandwidth leaves more bandwidth available for other tasks, making other processes run faster.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

Figure 1A:
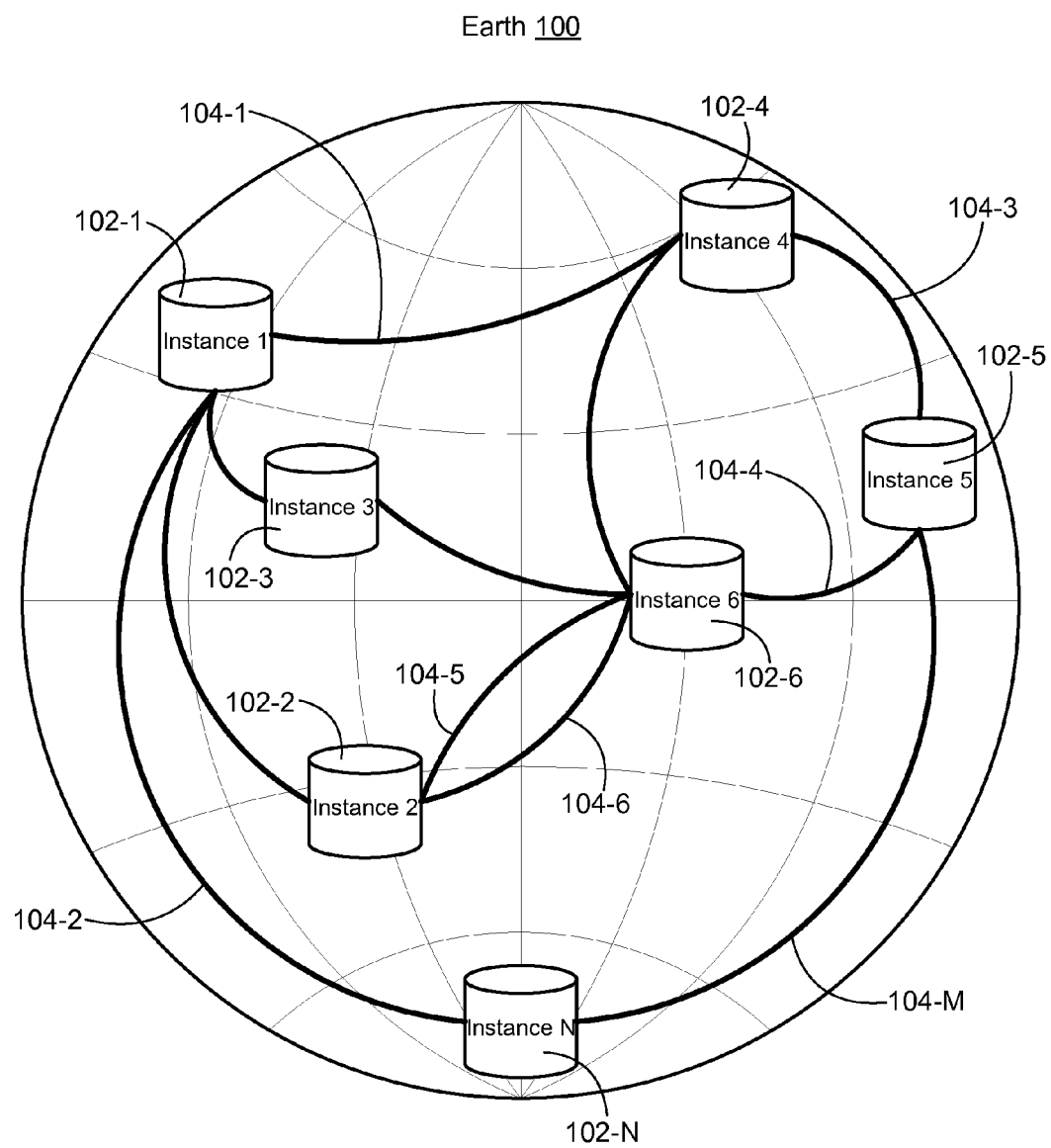
FIG. 1A is a conceptual illustration for placing multiple instances of a database at physical sites all over the globe according to some embodiments.
Figure 2:
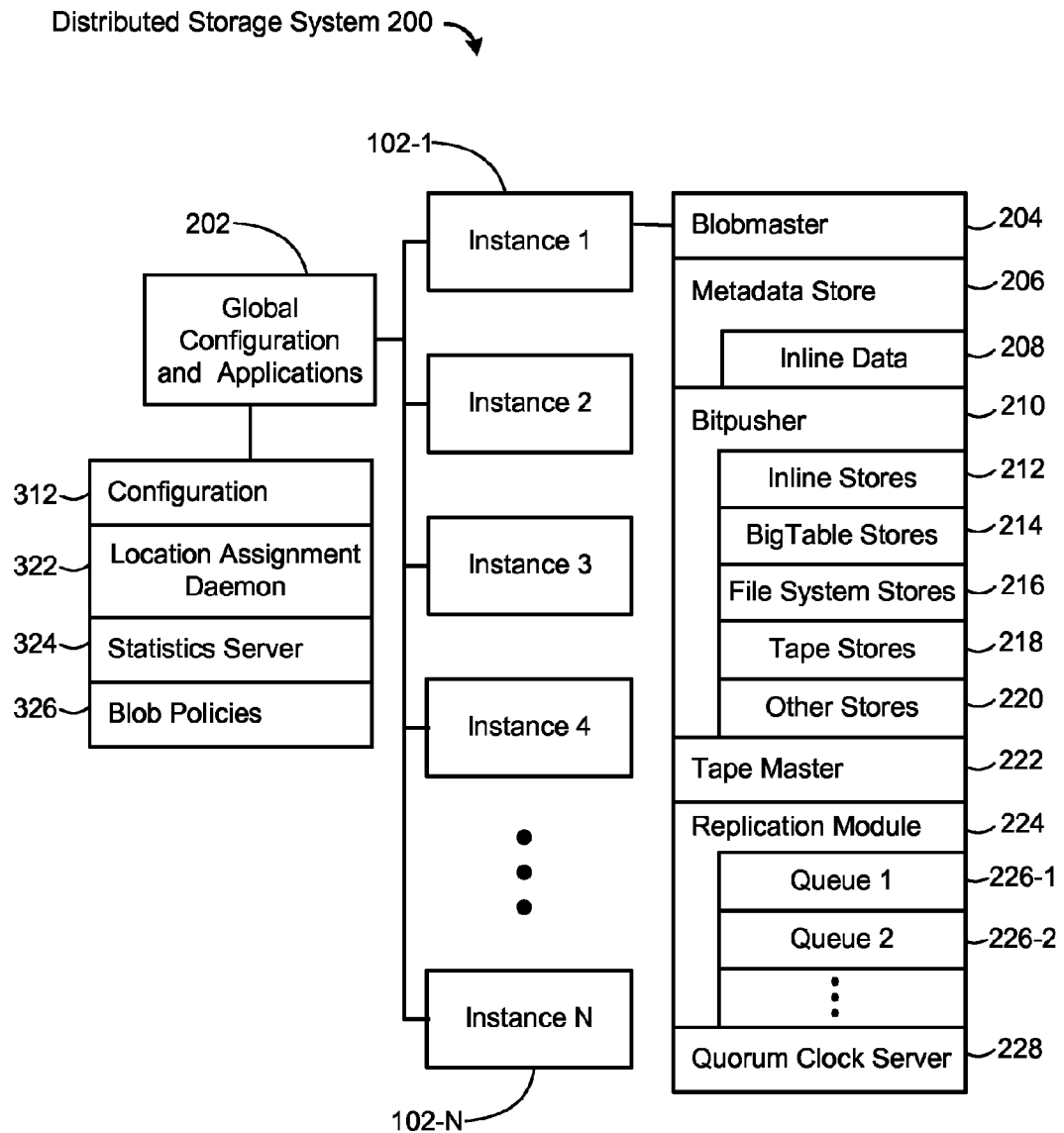
FIG. 2 is a block diagram illustrating multiple instances of a replicated database, with an exemplary set of programs and/or processes shown for the first instance according to some embodiments.
Figure 3:
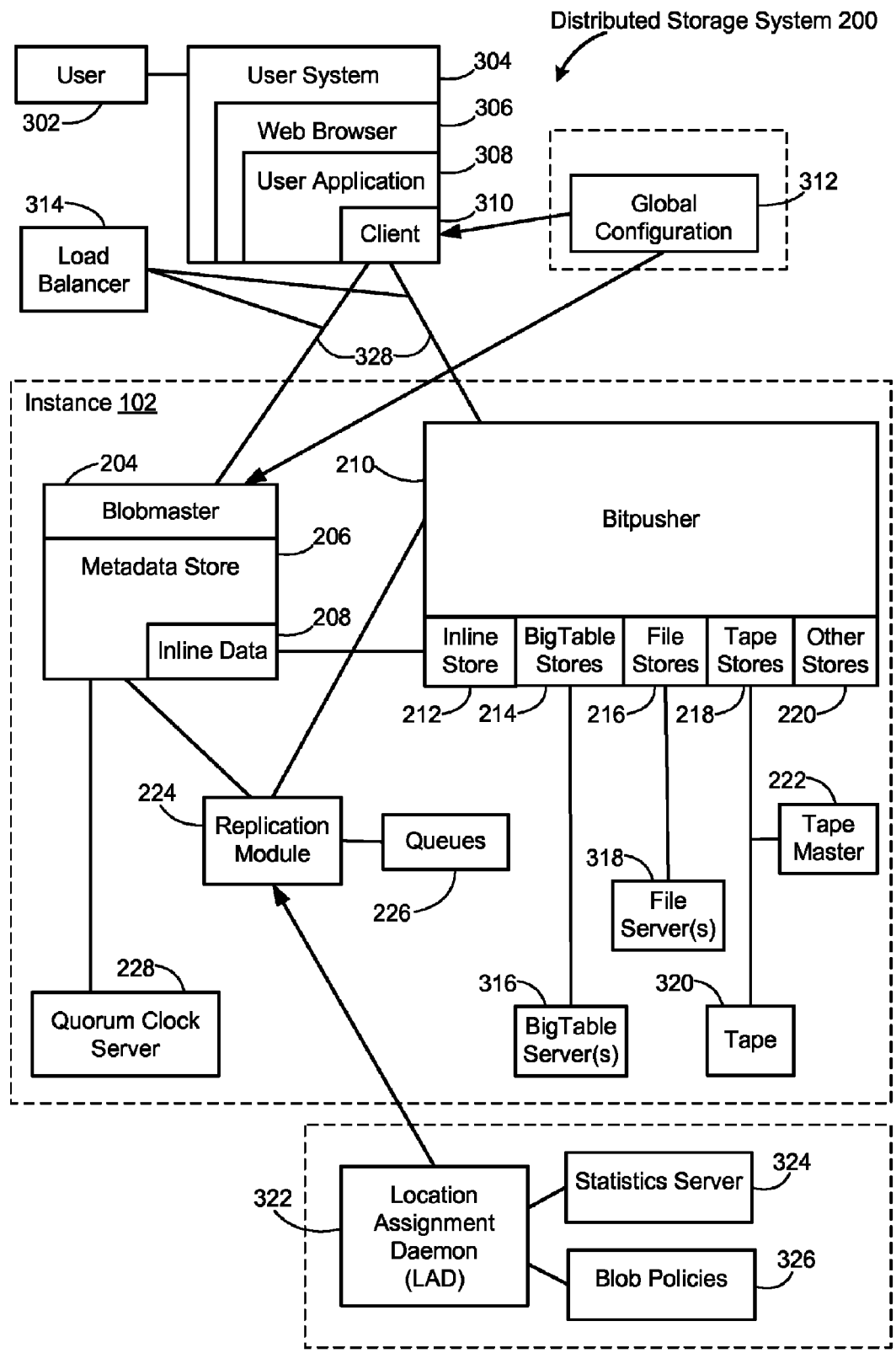
FIG. 3 is a block diagram that illustrates an exemplary instance for the system, and illustrates what blocks within the instance a user interacts with according to some embodiments.

The present specification describes a distributed storage system. In some embodiments, as illustrated in FIG. 1A, the distributed storage system is implemented on a global or planet-scale. In these embodiments, there are a plurality of instances 102-1, 102-2, ... 102-N at various locations on the Earth 100, connected by network communication links 104-1, 104-2, ... 104-M. In some embodiments, an instance (such as instance 102-1) corresponds to a data center. In other embodiments, multiple instances are physically located at the same data center. Although the conceptual diagram of FIG. 1 shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
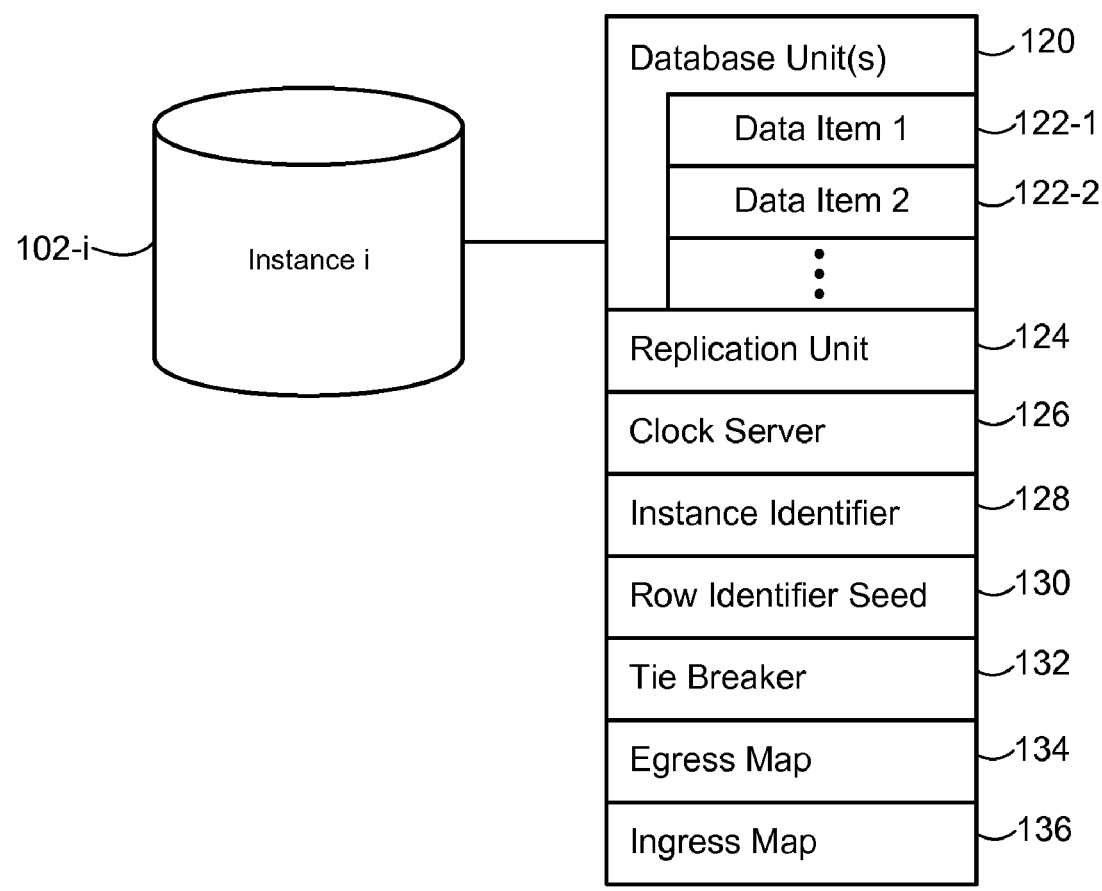
FIG. 1B illustrates basic functionality at each instance according to some embodiments.

FIG. 1B illustrates data and programs at an instance 102-*i* that store and replicate data between instances. The underlying data items 122-1, 122-2, etc. are stored and managed by one or more database units 120. Each instance 102-*i* has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances.

Each instance 102-*i* has one or more clock servers 126 that provide accurate time. In some embodiments, the clock servers 126 provide time as the number of microseconds past a well-defined point in the past. In preferred embodiments, the clock servers provide time readings that are guaranteed to be monotonically increasing. In some embodiments, each instance server 102-*i* stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-*i* stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described below with respect to FIGS. 6-7). In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

The distributed storage system 200 shown in FIGS. 2 and 3 includes certain global applications and configuration information 202, as well as a plurality of instances 102-1, ... 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned object. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob. The exemplary data structures in FIGS. 8A-8E illustrate other metadata that is stored in metadata table 206 in some embodiments.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. In preferred embodiments, communication between the client 310 and bitpushers 210 is routed according to a load balancer 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blob identifies which instances have copies of the desired blob, so in this example the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In preferred embodiments, a bitpusher has no knowledge of the contents of the data that is read or written, and does not attempt to interpret the contents. Embodiments of a bitpusher 210 support one or more types of data store. In preferred embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In preferred embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In preferred embodiments, the file system is distributed across many individual servers 318 to reduce risk of loss or unavailability of any individual computer.

Tape stores 218 store data on physical tapes 320. Unlike a tape backup, the tapes here are another form of storage. This is described in greater detail in co-pending U.S. Provisional Patent Application Ser. No. 61/302,909, filed Feb. 9, 2010, subsequently filed as U.S. patent application Ser. No. 13/023, 498, filed on Feb. 8, 2011, "Method and System for Providing Efficient Access to a Tape Storage System," which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution.

In some embodiments, each instance has a replication module 224, which identifies blobs or chunks that will be replicated to other instances. In some embodiments, the replication module 224 may use one or more queues 226-1, 226-2, . . . . Items to be replicated are placed in a queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests.

In some embodiments, there is a background replication process that creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226, with the lowest priority. The use of blob policies 326 and the operation of a location assignment daemon 322 are described in more detail in co-pending U.S. Provisional Patent Application Ser. No. 61/302,936, filed Feb. 9, 2010, subsequently filed as U.S. patent application Ser. No. 13/022,290, filed Feb. 7, 2011, "System and Method for managing Replicas of Objects in a Distributed Storage System," which is incorporated herein by reference in its entirety.

Figure 4:
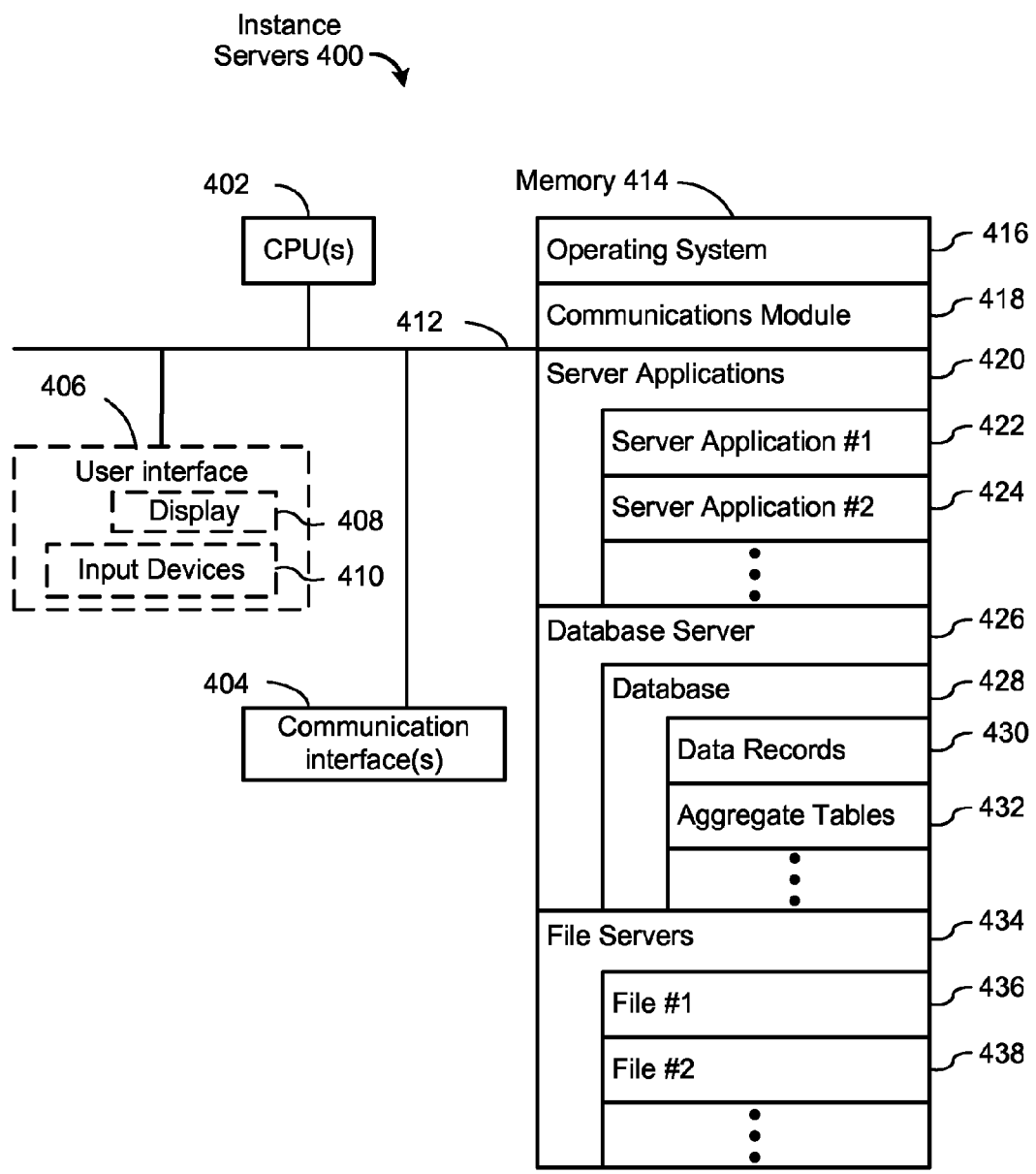
FIG. 4 is a block diagram of an instance server that may be used for the various programs and processes illustrated in FIGS. 1B, 2, and 3, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, programs and/or instructions stored in memory 414 and thereby performing processing operations; one or more network or other communications interfaces 404; memory 414; and one or more communication buses 412 for interconnecting these components. In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- one or more server applications 420, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 422 and 424 may execute on the same physical computer;
- one or more database servers 426 that provides storage and access to one or more databases 428. The databases 428 may provide storage for metadata 206, replication queues 226, blob policies 326, global configuration 312, the statistics used by statistics server 324, as well as ancillary databases used by any of the other functionality. Each database 428 has one or more tables with data records 430. In some embodiments, some databases include aggregate tables 432, such as the statistics used by statistics server 324; and one or more file servers 434 that provide access to read and write files, such as file #1 (436) and file #2 (438). File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods.

Figures 5, 6:
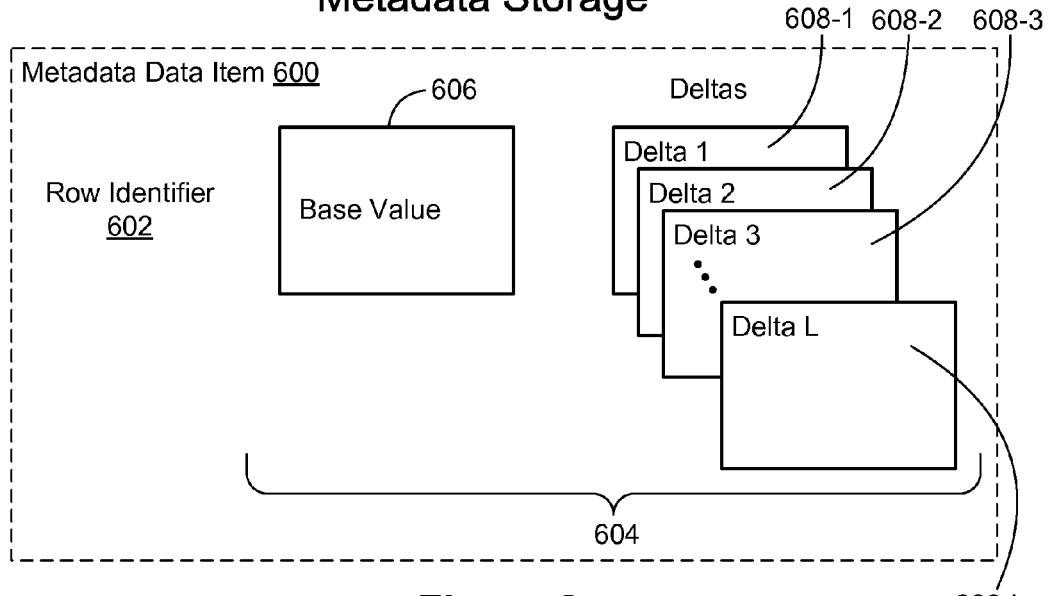
FIG. 5 illustrates a typical allocation of instance servers to various programs or processes illustrated in FIGS. 1B, 2, and 3, according to some embodiments.
FIG. 6 illustrates how metadata is stored according to some embodiments.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512) as tape masters. In some embodiments, each instance has about 10 instance servers performing (514) replication management, which includes both dynamic and background replication. In some embodiments, each instance has about 5 instance servers performing (516) as quorum clock servers.

FIG. 6 illustrates the storage of metadata data items 600 according to some embodiments. Each data item 600 has a unique row identifier 602. Each data item 600 is a row 604 that has a base value 606 and zero or more deltas 608-1, 608-2, ..., 608-L. When there are no deltas, then the value of the data item 600 is the base value 606. When there are deltas, the "value" of the data item 600 is computed by starting with the base value 606 and applying the deltas 608-1, etc. in order to the base value. A row thus has a single value, representing a single data item or entry. Although in some embodiments the deltas store the entire new value, in preferred embodiments the deltas store as little data as possible to identify the change. For example, metadata for a blob includes specifying what instances have the blob as well as who has access to the blob. If the blob is copied to an additional instance, the metadata delta only needs to specify that the blob is available at the additional instance. The delta need not specify where the blob is already located. As the number of deltas increases, the time to read data increases. The compaction process merges the deltas 608-1, etc. into the base value 606 to create a new base value that incorporates the changes in the deltas.

Although the storage shown in FIG. 6 relates to metadata for blobs, the same process is applicable to other non-relational databases, such as columnar databases, in which the data changes in specific ways. For example, an access control list may be implemented as a multi-byte integer in which each bit position represents an item, location, or person. Changing one piece of access information does not modify the other bits, so a delta to encode the change requires little space. In alternative embodiments where the data is less structured, deltas may be encoded as instructions for how to make changes to a stream of binary data. Some embodiments are described in publication RFC 3284, "The VCDIFF Generic Differencing and Compression Data Format," The Internet Society, 2002. One of ordinary skill in the art would thus recognize that the same technique applied here for metadata is equally applicable to certain other types of structured data.

Figure 7:
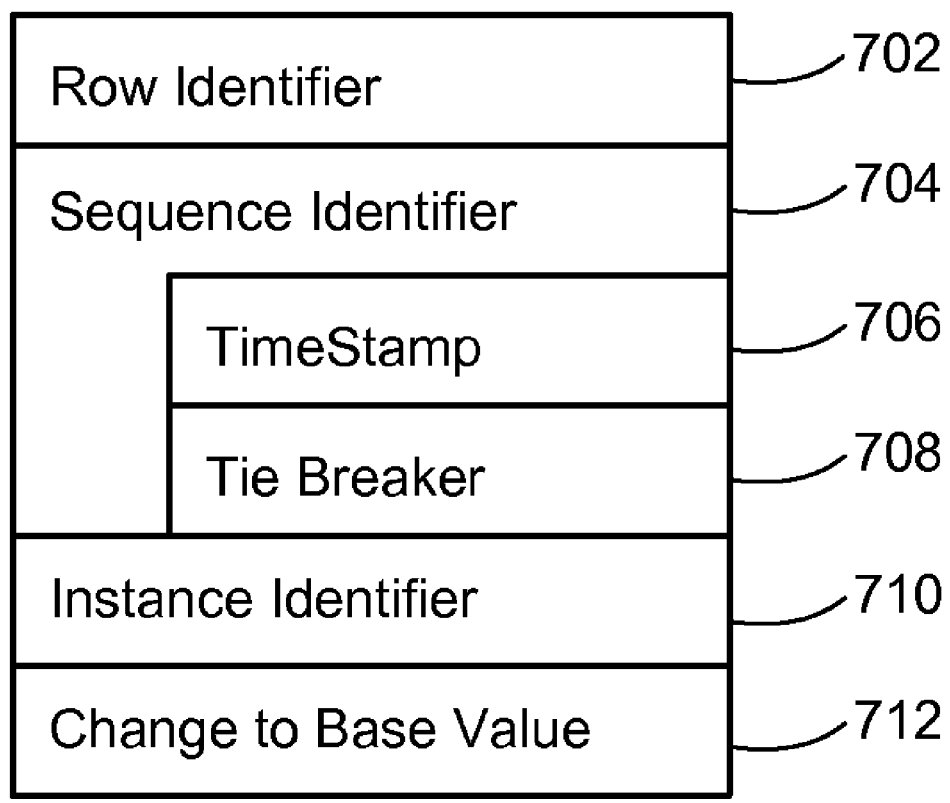
FIG. 7 illustrates a data structure that is used to store deltas according to some embodiments.

FIG. 7 illustrates an exemplary data structure to hold a delta. Each delta applies to a unique row, so the delta includes the row identifier 702 of the row to which it applies. In order to guarantee data consistency at multiple instances, the deltas must be applied in a well-defined order to the base value. The sequence identifier 704 is globally unique, and specifies the order in which the deltas are applied. In some embodiments, the sequence identifier comprises a timestamp 706 and a tie breaker value 708 that is uniquely assigned to each instance where deltas are created. In some embodiments, the timestamp is the number of microseconds past a well-defined point in time. In some embodiments, the tie breaker is computed as a function of the physical machine running the blobmaster as well as a process id. In some embodiments, the tie breaker includes an instance identifier, either alone, or in conjunction with other characteristics at the instance. In some embodiments, the tie breaker 708 is stored as a tie breaker value 132. By combining the timestamp 706 and a tie breaker 708, the sequence identifier is both globally unique and at least approximately the order in which the deltas were created. In certain circumstances, clocks at different instances may be slightly different, so the order defined by the sequence identifiers may not correspond to the "actual" order of events. However, in preferred embodiments, the "order," by definition, is the order created by the sequence identifiers. This is the order the changes will be applied at all instances.

A change to metadata at one instance is replicated to other instances. The actual change to the base value 712 may be stored in various formats. In some embodiments, data structures similar to those in FIGS. 8A-8E are used to store the changes, but the structures are modified so that most of the fields are optional. Only the actual changes are filled in, so the space required to store or transmit the delta is small. In other embodiments, the changes are stored as key/value pairs, where the key uniquely identifies the data element changed, and the value is the new value for the data element.

In some embodiments where the data items are metadata for blobs, deltas may include information about forwarding. Because blobs may be dynamically replicated between instances at any time, and the metadata may be modified at any time as well, there are times that a new copy of a blob does not initially have all of the associated metadata. In these cases, the source of the new copy maintains a "forwarding address," and transmits deltas to the instance that has the new copy of the blob for a certain period of time (e.g., for a certain range of sequence identifiers).

FIGS. 8A-8E illustrate data structures that are used to store metadata in some embodiments. In some embodiments, these data structures exist within the memory space of an executing program or process. In other embodiments, these data structures exist in non-volatile memory, such as magnetic or optical disk drives. In some embodiments, these data structures form a protocol buffer, facilitating transfer of the structured data between physical devices or processes. See, for example, the Protocol Buffer Language Guide, available at http://code.google.com/apis/protocolbuffers/docs/proto.html.

The overall metadata structure 802 includes three major parts: the data about blob generations 804, the data about blob references 808, and inline data 812. In some embodiments, read tokens 816 are also saved with the metadata, but the read tokens are used as a means to access data instead of representing characteristics of the stored blobs.

The blob generations 804 can comprise one or more "generations" of each blob. In some embodiments, the stored blobs are immutable, and thus are not directly editable. Instead, a "change" of a blob is implemented as a deletion of the prior version and the creation of a new version. Each of these blob versions 806-1, 806-2, etc. is a generation, and has its own entry. In some embodiments, a fixed number of generations are stored before the oldest generations are physically removed from storage. In other embodiments, the number of generations saved is set by a blob policy 326. (A policy can set the number of saved generations as 1, meaning that the old one is removed when a new generation is created.) In some embodiments, removal of old generations is intentionally "slow," providing an opportunity to recover an old "deleted" generation for some period of time. The specific metadata associated with each generation 806 is described below with respect to FIG. 8B.

Blob references 808 can comprise one or more individual references 810-1, 810-2, etc. Each reference is an independent link to the same underlying blob content, and each reference has its own set of access information. In most cases there is only one reference to a given blob. Multiple references can occur only if the user specifically requests them. This process is analogous to the creation of a link (a hard link) in a desktop file system. The information associated with each reference is described below with respect to FIG. 8C.

Inline data 812 comprises one or more inline data items 814-1, 814-2, etc. Inline data is not "metadata"—it is the actual content of the saved blob to which the metadata applies. For blobs that are relatively small, access to the blobs can be optimized by storing the blob contents with the metadata. In this scenario, when a client asks to read the metadata, the blobmaster returns the actual blob contents rather than read tokens 816 and information about where to find the blob contents. Because blobs are stored in the metadata table only when they are small, there is generally at most one inline data item 814-1 for each blob. The information stored for each inline data item 814 is described below in FIG. 8D.

Figure 8A:
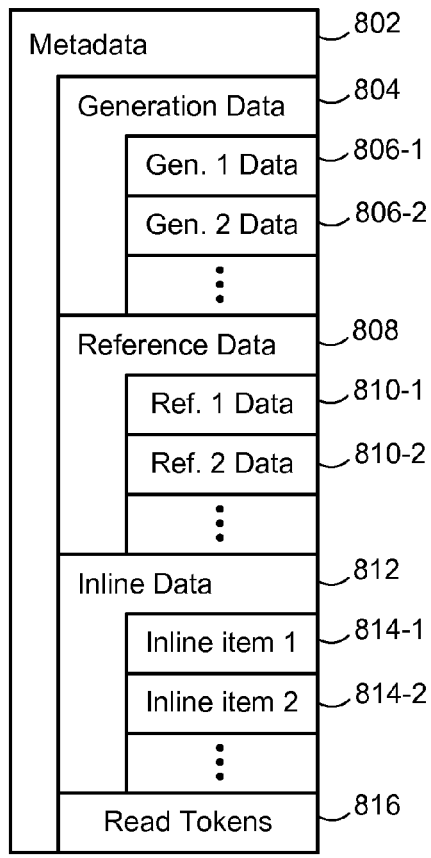
FIGS. 8A-8E illustrate data structures used to store metadata according to some embodiments.
Figure 8B:
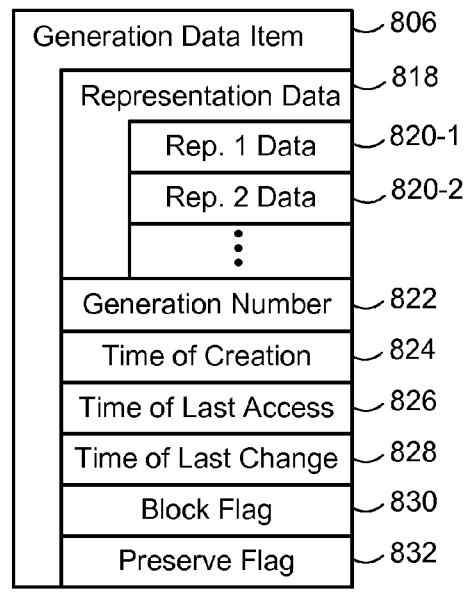

As illustrated in the embodiment of FIG. 8B, each generation 806 includes several pieces of information. In some embodiments, a generation number 822 (or generation ID) uniquely identifies the generation. The generation number can be used by clients to specify a certain generation to access. In some embodiments, if a client does not specify a generation number, the blobmaster 204 will return information about the most current generation. In some embodiments, each generation tracks several points in time. Specifically, some embodiments track the time the generation was created (824). Some embodiments track the time the blob was last accessed by a user (826). In some embodiments, last access refers to end user access, and in other embodiments, last access includes administrative access as well. Some embodiments track the time the blob was last changed (828). In some embodiments that track when the blob was last changed, changes apply only to metadata because the blob contents are immutable. Some embodiments provide a block flag 830 that blocks access to the generation. In these embodiments, a blobmaster 204 would still allow access to certain users or clients who have the privilege or seeing blocked blob generations. Some embodiments provide a preserve flag 832 that will guarantee that the data in the generation is not removed. This may be used, for example, for data that is subject to a litigation hold or other order by a court. In addition to these individual pieces of data about a generation, a generation has one or more representations 818. The individual representations 820-1, 820-2, etc. are described below with respect to FIG. 8E.

Figure 8C:
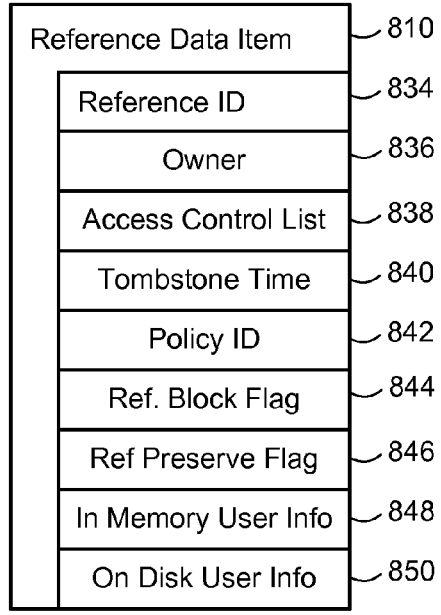

FIG. 8C illustrates a data structure to hold an individual reference according to some embodiments. Each reference 810 includes a reference ID 834 that uniquely identifies the reference. When a user 302 accesses a blob, the user application 308 must specify a reference ID in order to access the blob. In preferred embodiments, each reference has an owner 836, which may be the user or process that created the reference. Each reference has its own access control list ("ACL"), which may specify who has access to the blob, and what those access rights are. For example, a group that has access to read the blob may be larger than the group that may edit or delete the blob. In some embodiments, removal of a reference is intentionally slow, in order to provide for recovery from mistakes. In some embodiments, this slow deletion of references is provided by tombstones. Tombstones may be implemented in several ways, including the specification of a tombstone time 840, at which point the reference will be truly removed. In some embodiments, the tombstone time is 30 days after the reference is marked for removal. In preferred embodiments, certain users or accounts with special privileges can view or modify references that are already marked with a tombstone, and have the rights to remove a tombstone (i.e., revive a blob).

In some embodiments, each reference has its own blob policy, which may be specified by a policy ID 842. The blob policy specifies the number of copies of the blob, where the copies are located, what types of data stores to use for the blobs, etc. When there are multiple references, the applicable "policy" is the union of the relevant policies. For example, if one policy requests 2 copies, at least one of which is in Europe, and another requests 3 copies, at least one of which is in North America, then the minimal union policy is 3 copies, with at least one in Europe and at least one in North America. In some embodiments, individual references also have a block flag 844 and preserve flag 846, which function the same way as block and preserve flags 830 and 832 defined for each generation. In addition, a user or owner of a blob reference may specify additional information about a blob, which may include on disk information 850 or in memory information 848. A user may save any information about a blob in these fields.

Figure 8D:
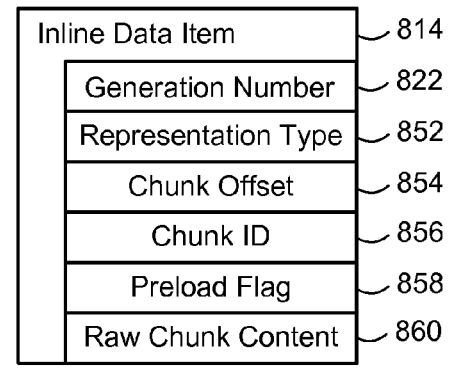

FIG. 8D illustrates inline data items 814 according to some embodiments. Each inline data item 814 is assigned to a specific generation, and thus includes a generation number 822. The inline data item also specifies the representation type 852, which, in combination with the generation number 822, uniquely identifies a representation item 820. (See FIG. 8E and associated description below.) In embodiments that allow multiple inline chunks for one blob, the inline data item 814 also specifies the chunk ID 856. In some embodiments, the inline data item 814 specifies the chunk offset 854, which specifies the offset of the current chunk from the beginning of the blob. In preferred embodiments, the chunk offset is specified in bytes. In some embodiments, there is a Preload Flag 858 that specifies whether the data on disk is preloaded into memory for faster access. The contents 860 of the inline data item 814 are stored with the other data elements.

Figure 8E:
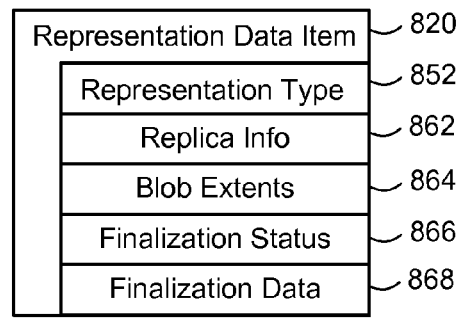

FIG. 8E illustrates a data structure to store blob representations according to some embodiments. Representations are distinct views of the same physical data. For example, one representation of a digital image could be a high resolution photograph. A second representation of the same blob of data could be a small thumbnail image corresponding to the same photograph. Each representation data item 820 specifies a representation type 852, which would correspond to "high resolution photo" and "thumbnail image" in the above example. The Replica Information 862 identifies where the blob has been replicated, the list of storage references (i.e., which chunk stores have the chunks for the blob). In some embodiments, the Replica Information 862 includes other auxiliary data needed to track the blobs and their chunks. Each representation data item also includes a collection of blob extents 864, which specify the offset to each chunk within the blob, to allow reconstruction of the blob.

When a blob is initially created, it goes through several phases, and some embodiments track these phases in each representation data item 820. In some embodiments, a finalization status field 866 indicates when the blob is UPLOADING, when the blob is FINALIZING, and when the blob is FINALIZED. Most representation data items 820 will have the FINALIZED status. In some embodiments, certain finalization data 868 is stored during the finalization process.

One primary function of a distributed storage system 200 as shown in FIGS. 1 and 3 is to enable clients at different geographical locations to access the data stored within the distributed storage system. To best serve the clients, the distributed storage system 200 employs a background replication process that helps to generate replicas for a blob in accordance with the blob's replication policy and place the replicas at different instances of the distributed storage system in anticipation of potential data access requests from clients located within a proximity of a respective instance.

Nonetheless, this strategy alone cannot prevent it from happening that an instance receives a client request for a blob that does not reside in that particular instance but in another instance or instances of the distributed storage system. When this occurs, there are at least two possible solutions. One is to forward the client request to the instance that has a replica of the requested blob and let that instance handle the client request. As will be explained below, this approach is acceptable in some cases, e.g., if the instance and the client are not so far apart to cause a significant latency between the request and the response and it is worthy of any additional cost relating to the network connection between the instance and the client in order to provide a better service to the client. But this approach may become less acceptable as the distance between the two entities increases, which could cause a longer latency and a higher pressure on the limited network resources. The second solution, as explained in detail below, is for the original instance to dynamically retrieve the data from the other instance and store the retrieved data at the original instance while serving the data to the client.

Figure 9A:
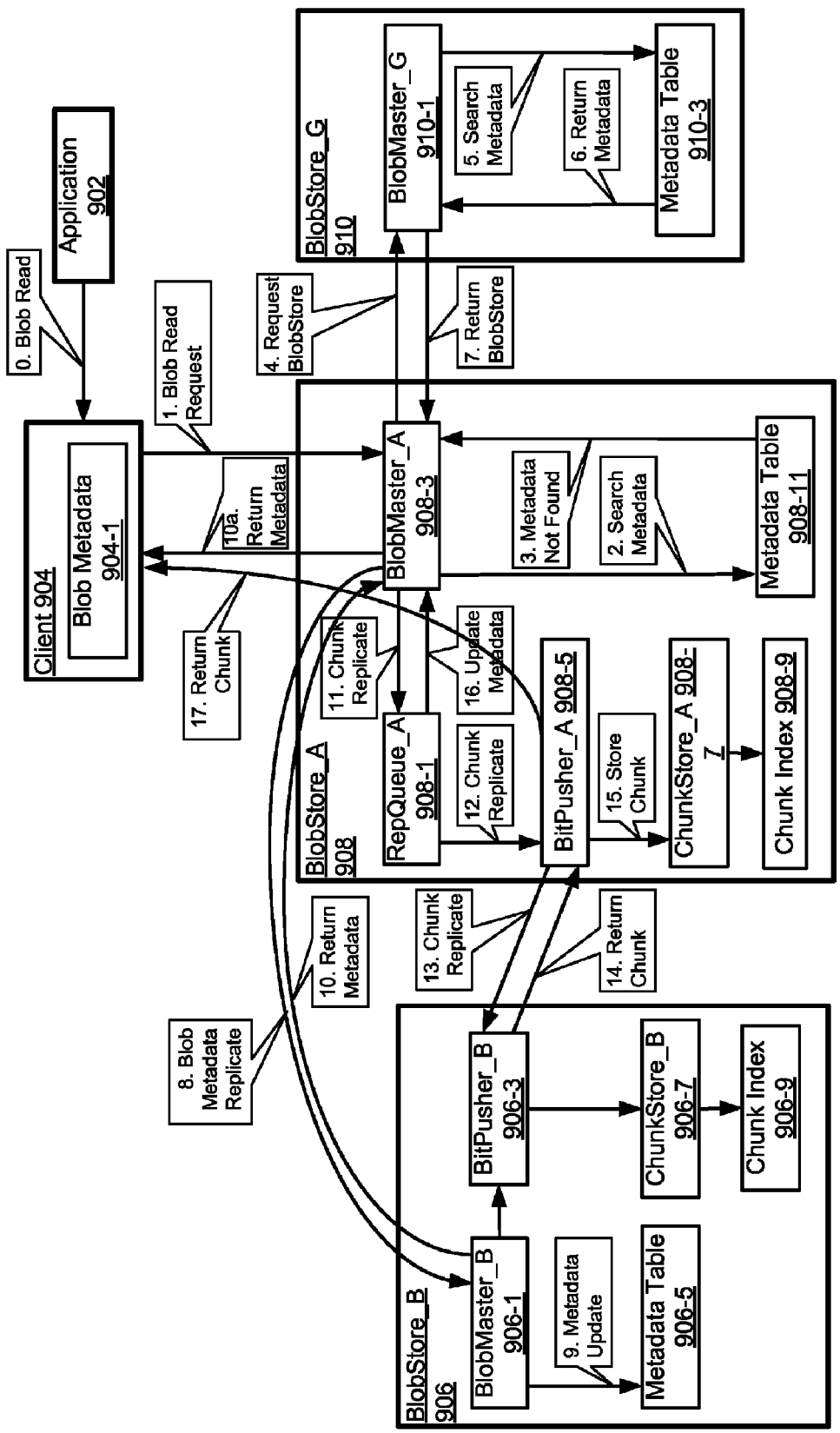
FIGS. 9A-9E illustrate block diagrams and data structures used for dynamically replicating data between different sub-systems of a planetary-scale distributed storage system according to some embodiments.
Figure 9B:
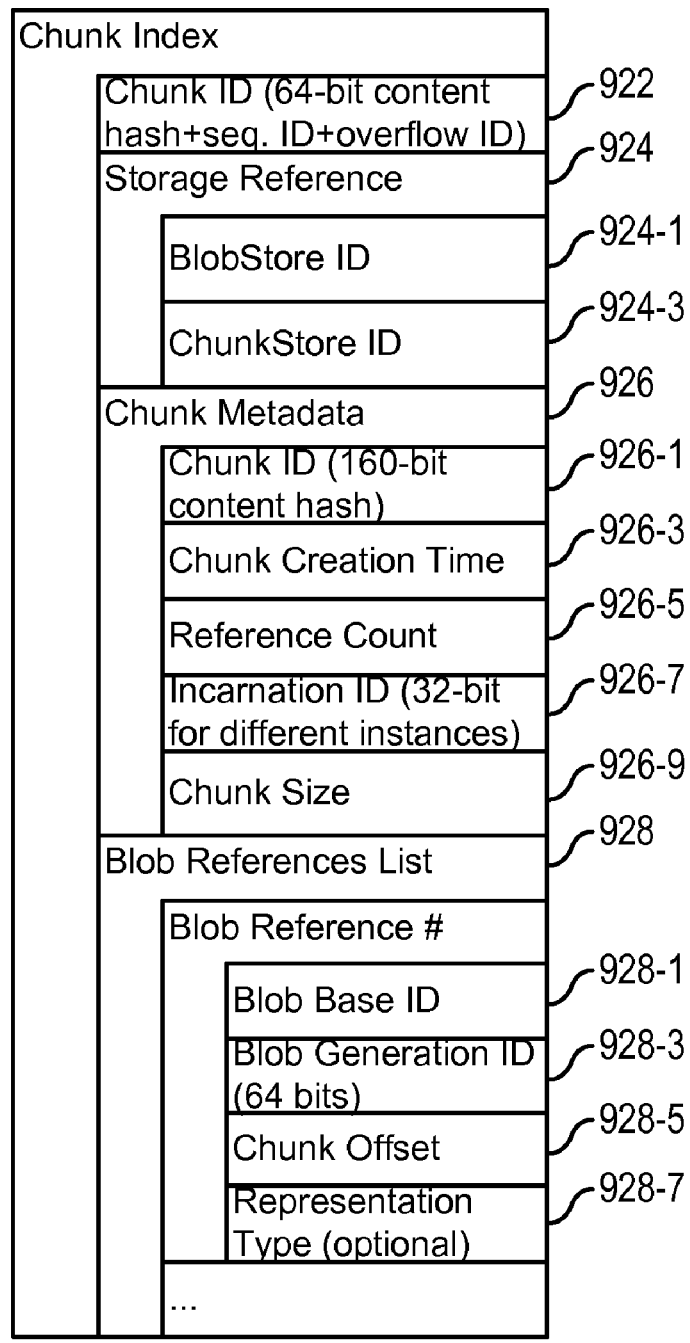
Figure 9E:
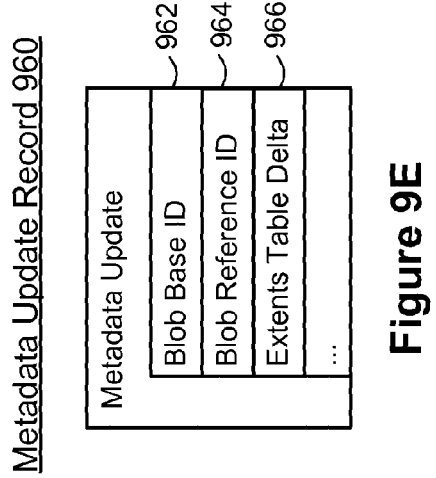
Figure 9D:
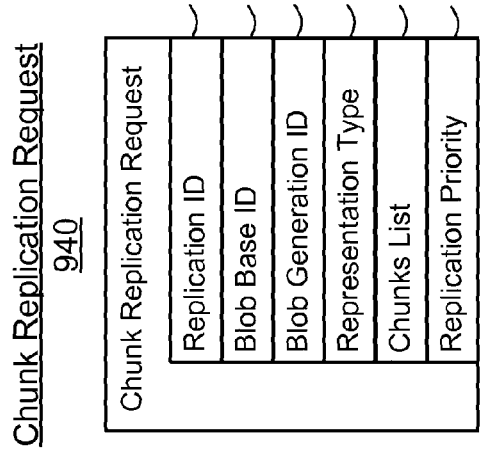
Figure 9C:
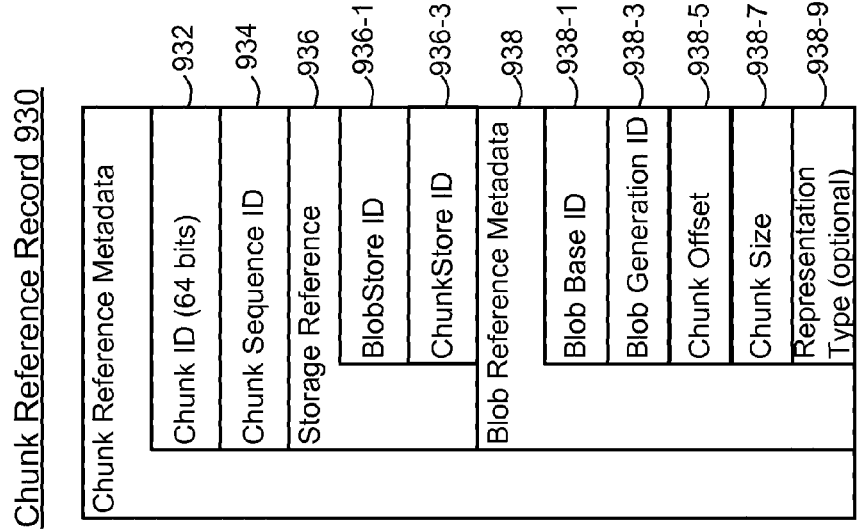
Figure 10A:
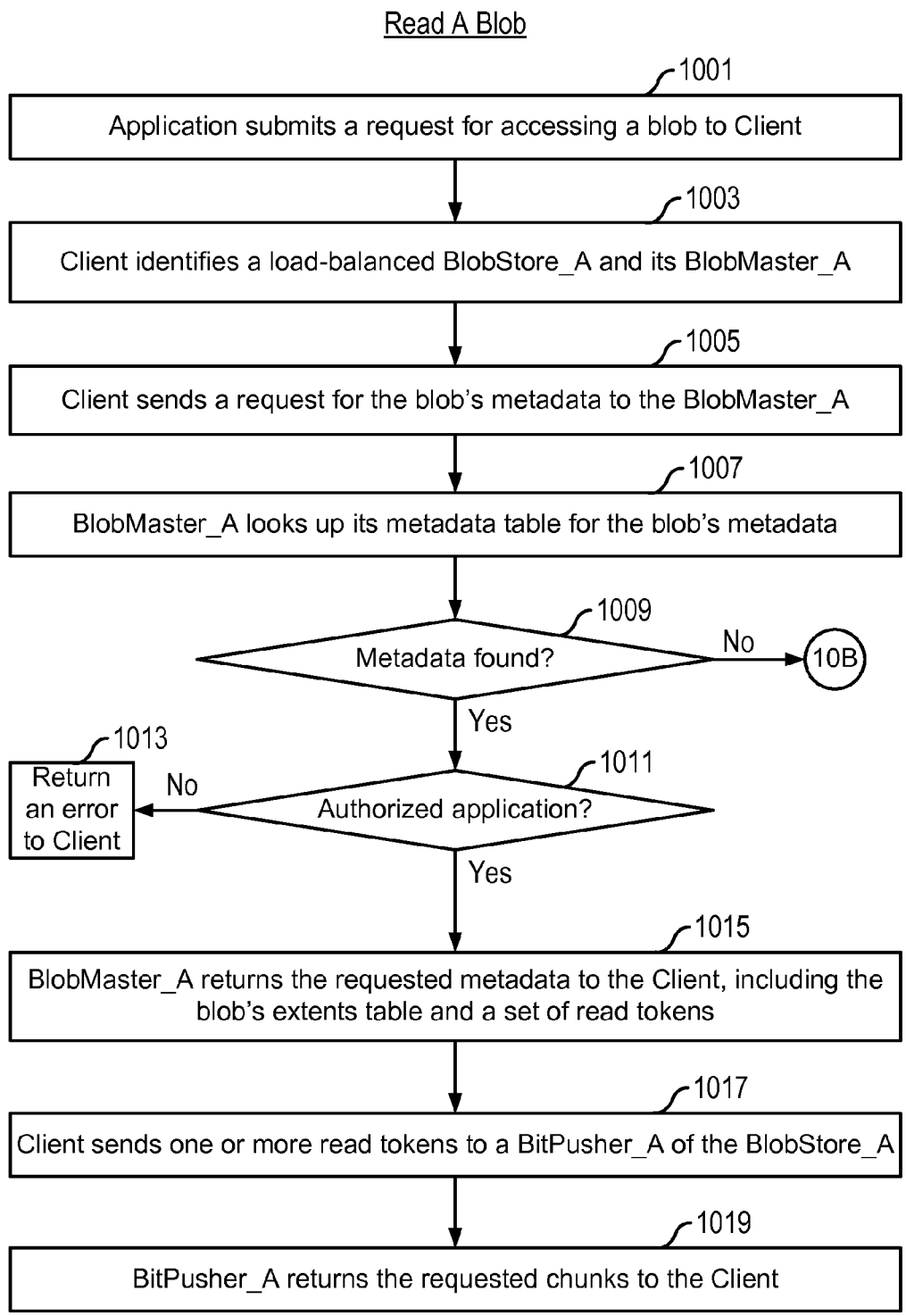
FIGS. 10A-10C illustrate flow charts of computer-implemented methods used for dynamically replicating data between different sub-systems of a planetary-scale distributed storage system according to some embodiments.
Figure 10B:
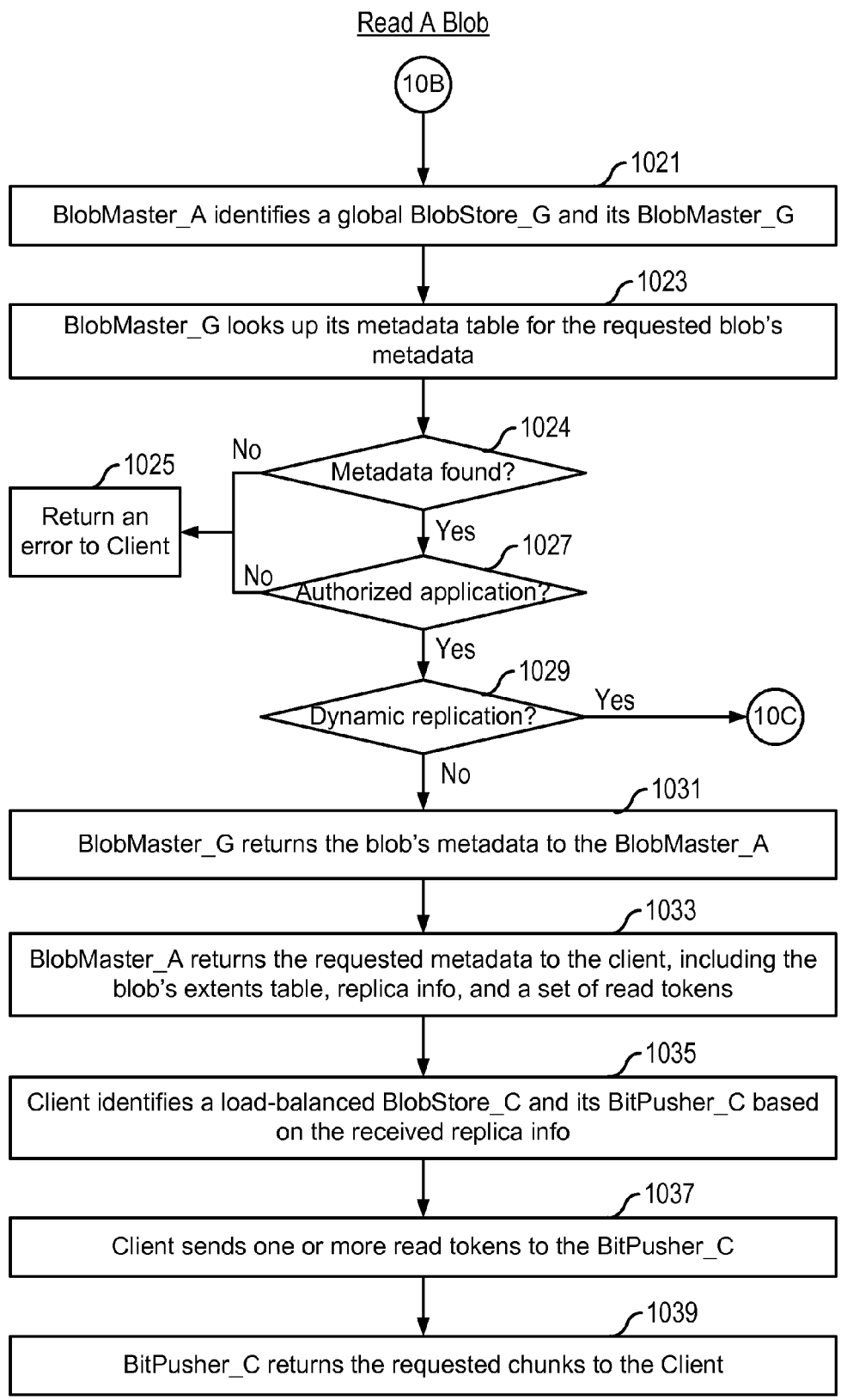
Figure 10C:
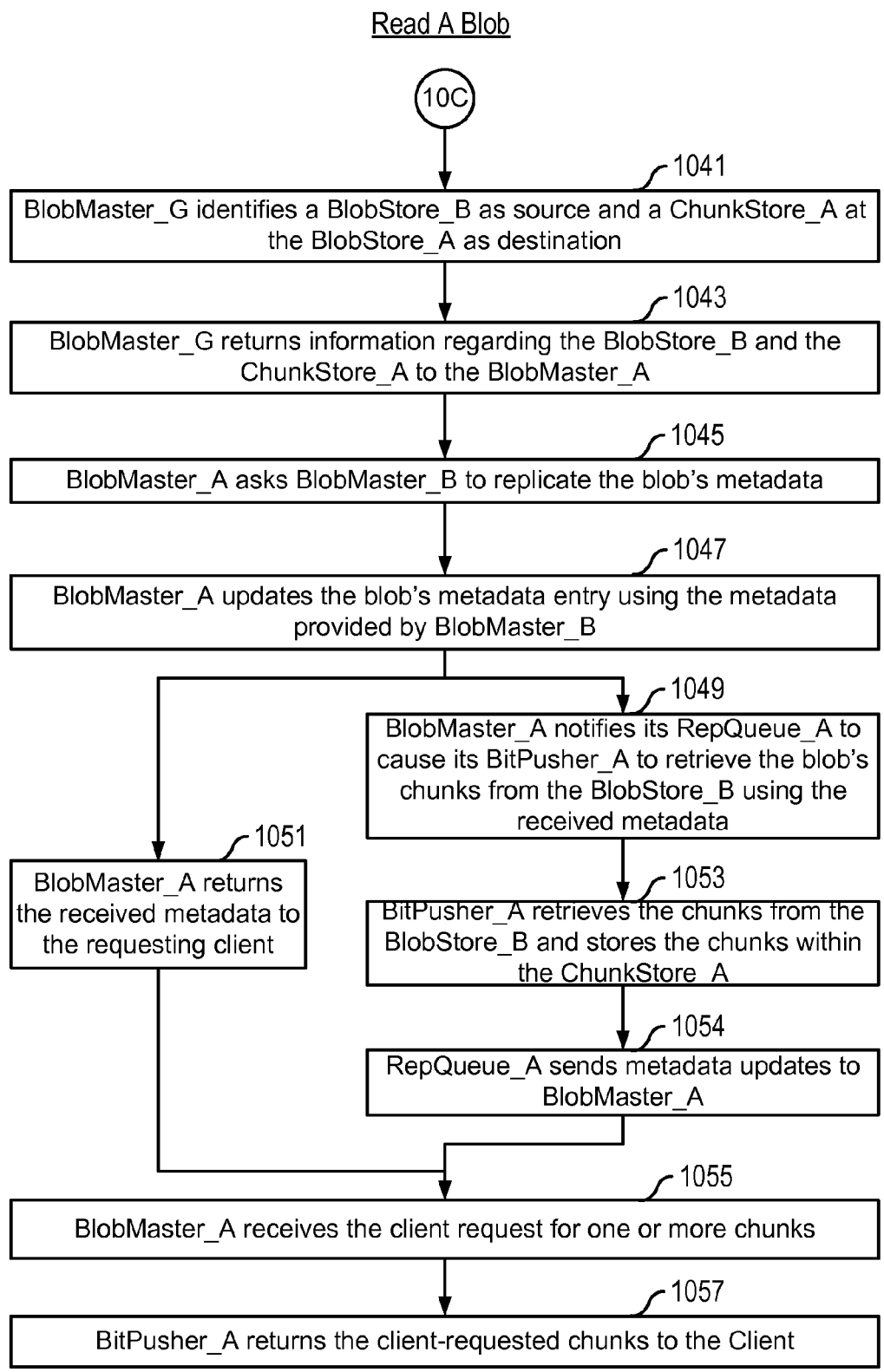

In particular, FIG. 9A depicts a block diagrams illustrative of how a client-requested blob is dynamically replicated from one blobstore to another blobstore with FIGS. 10A to 10C showing the corresponding flowcharts of this dynamic replication process. FIGS. 9B-9E depict block diagrams of data structures used by different components of the distributed storage system to support the dynamic replication between the two blobstores.

For illustrative purposes, FIG. 9A depicts a subset of components of the distributed storage system 200 as shown in FIGS. 1 and 3, including an application 902, a client 904, and three blobstores 906, 908, 910. In this example, the blobstore_A 908 and the blobstore_B 906 are local instances of the distributed storage system and the blobstore_G 910 is a global instance of the distributed storage system 200. Note that the term "blobstore" in this application corresponds to an instance 102 of the system 200 because it stores a plurality of blobs, each blob being a data object (e.g., an image, a text document, or an audio/video stream) that is comprised of one or more chunks.

As shown in FIG. 9A, the application 902 invokes the client 904 to read a blob from the distributed storage system by providing the blob's metadata 904-1 (e.g., a unique blob ID) to the client 904 (1001 of FIG. 10A). In response, the client 904 identifies a load-balanced blobstore_A 908 and its blobmaster_A 908-3 (1003 of FIG. 10A) and sends a read request including the requested blob's identifier to the blobmaster_A 908-3 (1005 of FIG. 10A). Note that the identification of a load-balanced blobstore does not require that the client 904 provide any metadata of the requested blob. Thus, there is no guarantee that the identified load-balanced blobstore_A 908 indeed has a replica of the requested blob.

Upon receipt of the client's read request, the blobmaster_A 908-3 looks up its metadata table 908-11 for a metadata entry corresponding to the blob ID (1007 of FIG. 10A). As described above in connection with FIGS. 8A-8E, a metadata entry includes multiple entities that describe various aspects of a blob stored within the distributed storage system. If the metadata table 908-11 includes an entry corresponding to the client-specified blob ID (1009 of FIG. 10A), the blobmaster_A 908-3 checks whether the application (or a user that invokes the application) is authorized to access the blob or not (1011 of FIG. 10A). In some embodiments, the blobmaster_A 908-3 uses the blob's read tokens 1816 to determine whether the application is authorized to access the blob or not. If the application is deemed to be eligible for access (no, 1011 of FIG. 10A), the blobmaster_A 908-3 returns an error message to the client 904 (1013 of FIG. 10A). Otherwise (yes, 1011 of FIG. 10A), the blobmaster_A 908-3 returns the requested blob's metadata including, e.g., an extents table and a set of read tokens to the requesting client (1015 of FIG. 10A). Other metadata returned to the client 904 may include a list of chunk stores across the distributed storage system, each chunk store having a replica of the requested blob. In some special cases, the returned metadata may include the inline chunks of the blob if its size is small enough.

Upon receipt of the metadata, the client 904 identifies a load-balanced bitpusher_A 908-5 associated with the blobstore_A 908 and sends the read tokens to the bitpusher_A 908-5 for the chunks associated with the blob (1017 of FIG. 10A). The bitpusher_A 908-5 then returns the client-requested chunks to the client to satisfy the application's original read request (1019 of FIG. 10A). Note that dynamic replication is not necessary in this example because the client-requested blob is present in the blobmaster_A 908.

FIG. 9A illustrates a different scenario in which the blobmaster_A 908-3 does not find the metadata entry corresponding to the client-requested blob (no, 1009 of FIG. 10A). When this happens, the blobmaster_A 908-3 asks a nearby load-balanced global blobstore (e.g., blobstore_G 910) for help (1021 of FIG. 10B). Unlike the local blobstore_A that has only the metadata of blobs residing in the blobstore_A, the global blobstore_G also has the metadata of blobs at any other instance of the distributed storage systems. Using the blob ID provided by the blobmaster_A 908-3, the blobmaster_G 910-1 looks up its metadata table 910-3 for the client-requested blob's metadata (1024 of FIG. 10B). If no matching metadata entry is found (no, 1024 of FIG. 10B), the blobmaster_G 910-1 returns an error message to the blobmaster_A 908-3, which then forwards the error message to the client to reject the client request (1025 of FIG. 10B). If the metadata is found (yes, 1024 of FIG. 10B) but the application that invokes the client is not authorized to access the blob (no, 1027 of FIG. 10B), the client also receives an error message denying its request (1025 of FIG. 10B).

If the metadata is found (yes, 1024 of FIG. 10B) and the application is also authorized to access the blob (yes, 1027 of FIG. 10B), the client's blob access request will be satisfied. Before returning any blob metadata to the blobmaster_A 908-3, the blobmaster_G 910-1 needs to decide whether a new copy of the requested blob should be dynamically replicated at the blobstore_A 908 (1029 of FIG. 10B). In some embodiments, the blobmaster_G 910-1 considers multiple factors when making the decision. A first factor is the distance between the blobstore_A 908 and the nearest source instance that has a replica of the requested blob. In some embodiments, the distance between two blobstores is measured by the latency from a first moment at which the destination blobstore sends a request to the source blobstore to a second moment at which the destination blobstore receives a response from the source blobstore. For instance, a set of predefined threshold latencies may be defined as follows: 5 ms latency for a communication across a city; 40 ms latency for a communication across a continent; and 80 ms latency for an inter-continental communication. Latency between the source and destination instances that is higher than the corresponding threshold levels may support the decision of dynamic replication and vice versa.

A second factor that affects the blobmaster_G 910's decision is the cost of the network connection used for dynamically replicating the blob between the source and destination instances. Because the distributed storage system typically assigns a higher priority to the dynamic replication than the background replication, this higher priority may correspond to a higher network connection cost. On the other hand, this factor is balanced with the popularity of the requested blob in the vicinity of the destination instance. For example, if there has been a high demand for the requested blob or the like in the past or the blobmaster_G 910 anticipates that the future demand for the blob or the like is high, it may determine that the cost associated with the dynamic replication is worthwhile in the long run.

A third factor that may affect the blobmaster_G 910's decision is that the distributed storage system may need to comply with certain administrative or legal requirements. For example, a requirement that an instance in the US should not maintain a replica of the requested blob may negate all the other factors that favor the dynamic replication. In some embodiments, the distributed storage system uses the dynamic replication decision-making process for a blob to modulate the blob's default replication policy. For example, a client may specify that a blob's default replication policy is two replicas within the distributed storage system and one backup replica on a tape storage system. In practice, the distributed storage system may add more replicas of the blob through dynamic replication if necessary.

As shown in FIG. 10B, assuming that the blobmaster_G 910-1 determines that there is no need to replicate the blob (no, 1029 of FIG. 10B), e.g., there is a replica of the blob in at least one instance near the requesting client, the blobmaster_G 910-1 returns the blob's metadata to the blobmaster_A 908-3 (1031 of FIG. 10B). As described above in connection with FIGS. 8A-18 E, a blob's metadata includes replica info 1862, which may be a list of storage references that have a replica of the blob, and blob extents, which is an extents table that maps the blob's logical address to a chunk ID. The blobmaster_A 908-3 then returns the metadata, including the extents table, the replica info, and read tokens, back to the requesting client (1033 of FIG. 10B).

Upon receipt of the metadata, the client identifies a load-balanced blobstore_C and its bitpusher_C (1035 of FIG. 10B). In some embodiments, this blobstore_C is an instance near the client 904. In the future, the client 904 will not contact the blobstore_A 908 for any request relating to the blob but direct its requests for the blob to the blobstore_C. For example, if the client 904 decides to retrieve the blob's content, the client 904 may send one or more read tokens to the bitpusher_C (1037 of FIG. 10B). The bitpusher_C then accesses the corresponding chunk store within the blobstore_C and returns the requested chunks back to the client 904 (1039 of FIG. 10B).

As shown in FIG. 9A, if the blobmaster_G 910-1 determines that a dynamic replication of the client-requested blob is needed (yes, 1029 of FIG. 10B), the blobmaster_G 910-1 then identifies a blobstore_B 906, which is one of the remote instance that has a replica of the requested blob, as the source of the replication, and optionally a chunkstore_A 908-7 within the blobstore_A 908 as the destination of the replication (1041 of FIG. 10C). The blobmaster_G 910-1 triggers the blobmaster_A 908-3 to start the dynamic replication of the requested blob by returning information about this two entities and the other blob metadata to the blobmaster_A 908-3 (1043 of FIG. 10C).

In some embodiments, the metadata and content of a blob are separately replicated from the source blobstore to the destination blobstore. A client's need for the blob content often depends on its processing result of the blob metadata. Sometimes, the client does not need to access the blob content after reading the blob metadata. From the blobmaster_G 910-1's response, the blobmaster_A 908-3 identifies the source blobstore_B 906 and sends a metadata replication request to the blobmaster_B 906-1 of the blobstore_B 906 (1045 of FIG. 10C). The blobmaster_B 906-1, upon receipt of the request, updates the blob's metadata in the metadata table 906-5 to indicate that the local replica of the blob is currently serving as a source of a dynamic replication to prevent any attempt to delete the replica. In addition, the blobmaster_B 906-1 returns the blob's metadata to the blobmaster_A 908-3. Using the received metadata, the blobmaster_A 906-3 generates a new entry in the metadata table 908-11 of the blobstore 908 (1047 of FIG. 10C). In some embodiments, the blobmaster_A 908-3 updates the newly-generated metadata in the metadata table 908-11 to indicate that a new replica of the blob is being generated at the blobstore 908, e.g., by setting the finalization status of the blob to be "uploading."

In some embodiments, the blobmaster_A 908-3 returns the metadata it receives from the blobmaster_B 906-1 to the requesting client 904 (1051 of FIG. 10C). As noted above, a client needs to access a blob's extents table before it can request any portion of the blob content. In addition, the client may choose not to retrieve any blob content after analyzing the metadata. In doing so, the blobmaster_A 908-3 can respond to the client's request more promptly without waiting for the arrival of the blob content from the source blobstore_B 906 to the destination blobstore_A 908. From the metadata returned by the blobmaster_B 906-1, the blobmaster_A 908-3 identifies the blob's extents able, which maps the blob's logical range to one or more chunk IDs at a chunk store within the blobstore_B 906. The blobmaster_A 908-3 then notifies the repqueue_A 908-1 of the blobstore 908 to schedule a chunk replication request to cause a load-balanced bitpusher_A 908-5 to retrieve the chunks from the blobstore_B 906 (1049 of FIG. 10C).

FIG. 9D depicts an exemplary chunk replication request 940 that includes multiple attributes: a replication ID 942, a blob base ID 944, a blob generation ID 946, a representation type 948, a chunks list 950, and a replication priority 952. In some embodiments, the replication ID 942 further includes a source chunk store ID that identifies a chunk store 906-7 within the blobstore_B 906, a destination chunk store ID that identifies a chunk store 908-7 within the blobstore_A 908, a user ID that initiates the replication, and a network quality of service parameter. A combination of the blob base ID 944 and the blob generation ID 946 uniquely identifies a particular generation of the blob to be replicated. In some embodiments, both parameters are originally provided by the client who initiates the access request for the blob. The chunks list 950 typically includes one or more pairs of chunk ID and chunk sequence ID, each pair uniquely identifying a chunk within the corresponding chunk store. The replication priority 952 indicates whether this is a high-priority real-time/dynamic replication or a low-priority background replication.

The bitpusher_A 908-5 identifies a list of chunks to be replicated from the chunk replication request and forwards the chunks list to the bitpusher_B 906-3. For each chunk to be replicated, the bitpusher_B 906-3 generates a chunk reference record that includes the chunk's metadata and returns to the chunk reference record together with the chunk content back to the bitpusher_A 908-5.

FIG. 9C depicts a data structure of an exemplary chunk reference record 930 that includes multiple attributes: a chunk ID 932, a chunk sequence ID 934, a storage reference 936 comprising a blobstore ID 936-1 and a chunkstore ID 936-3, and blob reference metadata 938 including a blob base ID 938-1, a blob generation ID 938-3, a chunk offset within the blob 938-5, a chunk size 938-7, and an optional representation type 938-9. In some embodiments, the chunk ID 932 is a content hash that has multiple bits (e.g., 64 or 160). Because the same chunk may have different incarnations corresponding to different blobs, the chunk sequence ID 934 is used for identifying a particular incarnation of a chunk using, e.g., the chunk creation timestamp.

For each chunk returned by the bitpusher_B 906-3, the bitpusher_A 908-5 inserts the chunk into the corresponding destination chunkstore_A 908-7 (1053 of FIG. 10C). In some embodiments, the bitpusher_A 908-5 generates a chunk index record for the new chunk using the chunk reference record provided by the bitpusher_B 906-3 and inserts the chunk index record into the chunkstore_A 908-5's chunk index table 908-9.

FIG. 9B depicts a data structure of an exemplary chunk index record 920 that includes multiple attributes: a short chunk ID 922, a storage reference 924 comprising a blobstore ID 924-1 and a chunkstore ID 924-3, chunk metadata 926 (further including a long chunk ID 926-1, a chunk creation time 926-3, a reference count 926-5, an incarnation (or sequence) ID 926-7, and a chunk size 926-9), and blob references list 928 that identifies one or more blobs that include the chunk as a port of the blob (each blob reference further including a blob base ID 928-1, a blob generation ID 928-3, a chunk offset within the blob 928-5, and an optional representation type 928-7). In some embodiments, the short chunk ID 922 is exposed to the client while the long chunk ID 926-1 is for internal use by the distributed storage system.

Note that the blob's metadata initially stored in the metadata table 908-11 is a copy of the metadata from the blobstore_B 906. In some embodiments, replicas of the same blob at different instances have different extents tables to reflect the exact physical location of a respective replica within a corresponding chunk store. As each chunk arrives at the blobstore_A 908 from the blobstore_B 906 and settles at a particular chunk store within the blobstore_A 908, the corresponding blob's extents table needs to be updated accordingly. In some embodiments, the bitpusher_A 908-5 notifies the repqueue_A 908-1 of the arrival of a new chunk at the bitpusher_A 908-5. The repqueue_A 908-1 then generates a metadata update and send the metadata update to the blobmaster_A 908-3 (1054 of FIG. 10C). The metadata update includes the actual location of the new chunk within the blobstore_A 908 (which may or may not be the chunkstore_A 908-7).

FIG. 9E depicts a data structure of an exemplary metadata update record 960 that includes multiple attributes: a blob base ID 962, a blob reference ID 964, and an extents table delta 966 that identifies a chunk store in which a chunk resides. In some embodiments, the blob base ID 954 uniquely identifies a corresponding metadata entry in the metadata table and the blob reference ID 956 identifies a reference metadata sub-entry within the metadata entry. A more detailed description of the reference metadata sub-entry is provided above in connection with FIG. 8C.

Using the metadata update, the blobmaster_A 908-3 updates the blob's extents table to track down the location of a newly-arrived chunk. In some embodiments, the blobmaster_A 908-3 checks whether the newly-arrived chunk is the last chunk of the blob that is scheduled to be replicated from the blobstore_B 906 to the blobstore_A 908. If so, the blobmaster_A 908-3 then checks the extents table to determine if all the chunks associated with the same blob are within the same chunk store (e.g., chunkstore_A 908-7) of the blobstore_A 908. If so, the blobmaster_A 908-3 updates the finalization status of the blob from "uploading" to "finalized," indicating that the dynamic replication of the client-requested blob from the blobstore_B 906 to the blobstore_A 908 is successfully completed. A subsequent metadata replication updates the metadata of the replicas of the same blob at the other instances to include the new replica at the blobstore_A 908.

In some embodiments, when multiple chunks of the same blob are replicated from the source blobstore_B 906 to the destination blobstore_A 908, they may be initially placed into different chunk stores within the blobstore_A 908 by different bitpushers at the blobstore_A 908. The blobmaster_A 908-3 can tell whether this occurs or not from checking the extents table. If the multiple chunks associated with the same blob are located within different chunk stores of the blobstore_A 908, the blobmaster_A 908-3 updates the finalization status of the blob from "uploading" to "finalizing." The blobmaster_A 908-3 then instructs the repqueue_A 908-1 to cause a bitpusher_A 908-5 to relocate the chunks to the destination chunk store chosen by the blobmaster_G 910-1 or the blobmaster_A 908-3. For each relocated chunk, the repqueue_A 908-1 also sends a metadata update to the blobmaster_A 908-3 to update the extents table. When all the chunks are found to be within the same chunk store, the blobmaster_A 908-3 then updates the finalization status of the blob from "uploading" to "finalized," indicating that the dynamic replication of the client-requested blob from the blobstore_B 906 to the blobstore_A 908 is successfully completed. A subsequent metadata replication updates the metadata of the replicas of the same blob at the other instances to include the new replica at the blobstore_A 908.

As noted above, the chunk 904 receives the blob's metadata and extracts its extents table from the metadata. If the client 904 needs to access one or more chunks associated with the blob, it can identifies the corresponding chunk IDs from the extents table and send the chunk IDs as well as the corresponding read tokens to a load-balanced bitpusher_A 908-5 for the requested chunks. Upon receipt of the client request (1055 of FIG. 10C), the bitpusher_A 908-5 identifies the corresponding chunks in the chunkstore_A 908-7 and returns them to the client (1057 of FIG. 10C). In some embodiments, the bitpusher_A 908-5 serves the received chunks directly to the requesting client as soon as the chunks arrives at the bitpusher_A 908-5 (e.g., if it already receives the client request for the chunks) while generating a local copy of the chunks in the chunkstore_A 908-7. As noted above, the decision for making a local replica of the blob is to serve future client requests for the same blob more promptly. In some embodiments, the new replica of the blob stored at the blobstore_A 908 is identical to the replica of the blob at the blobstore_B 906.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for replicating objects within a distributed storage system, wherein the distributed storage system includes a plurality of storage sub-systems, comprising:
    at a first storage sub-system having one or more processors and memory storing one or more programs for execution by the one or more processors,
        receiving from a client a first client request for an object that is not present in the first storage sub-system;
        identifying a second storage sub-system as having a replica of the requested object, wherein the requested object includes content and metadata;
        submitting an object replication request for the requested object to the second storage sub-system, further comprising:
            receiving metadata of the requested object from a metadata management component of the second storage sub-system, wherein the metadata includes an extents table of the requested object;
            identifying a location of the object content at the second storage sub-system using the extents table;
        independently receiving the content and metadata of the requested object from the second storage sub-system;
        generating a new replica of the object at the first storage sub-system using the received metadata and content; and
        returning the metadata of the new replica of the object to the client.

2. The computer-implemented method of claim 1, further comprising:
    upon receipt of the first client request,
        extracting an object ID of the requested object from the first client request;
        querying a metadata table of the first storage sub-system using the object ID; and
        determining whether the object is present in the first storage sub-system in accordance with the query result.

3. The computer-implemented method of claim 1, wherein identifying a second storage sub-system further comprises:
    sending a query for the requested object to a third storage sub-system, wherein the third storage sub-system includes metadata of objects stored at the plurality of storage sub-systems; and
    receiving a response from the third storage sub-system, wherein the response identifies the second storage sub-system as source and a chunk store within the first storage sub-system as destination.

4. The computer-implemented method of claim 1, wherein submitting an object replication request for the requested object to the second storage sub-system further comprises:
    submitting a content replication request to a content management component of the second storage sub-system, wherein the content replication request includes the identified content location of the requested object.

5. The computer-implemented method of claim 4, wherein the content replication request is given a priority higher than other content replication requests that are not triggered by a real-time client request.

6. The computer-implemented method of claim 4, further comprising:
    upon receipt of the metadata of the requested object,
        generating a metadata entry for the object in a metadata table of the first storage sub-system;
        inserting the received metadata into the newly-generated metadata entry of the metadata table;
        setting an object state attribute in the newly-generated metadata entry as "uploading;" and
        returning the newly-generated metadata entry to the requesting client.

7. The computer-implemented method of claim 6, wherein the object content includes one or more chunks, further comprising:
    receiving from the client a second client request for accessing a client-specified portion of the object;
    for a respective chunk received from the second storage system,
        returning the chunk to the requesting client if the chunk overlaps with the client-specified portion of the object;
        storing a replica of the chunk within the first storage sub-system; and
        updating the metadata entry in the first storage sub-system to reflect the presence of the chunk within the first storage sub-system.

8. The computer-implemented method of claim 7, wherein updating the metadata entry in the first storage sub-system further comprises:

generating a metadata update for the chunk, wherein the metadata update includes location information of the chunk within the first storage sub-system;

updating an extents table of the metadata entry using the location information of the chunk;

updating the object state attribute of the metadata entry to be "finalized" if the plurality of chunks of the object are located within one chunk store of the first storage sub-system; and updating the object state attribute of the metadata entry to be "finalizing" if the plurality of chunks of the object are located within multiple chunk stores of the first storage sub-system.

9. The computer-implemented method of claim 8, further comprising:

moving the plurality of chunks from the multiple chunk stores of the first storage sub-system to a destination chunk store of the first storage sub-system; and updating the object state attribute of the metadata entry to be "finalized" if the plurality of chunks of the object are located within the destination chunk store of the first storage sub-system.

10. A computer system for replicating objects within a distributed storage system, wherein the distributed storage system includes a plurality of storage sub-systems, comprising:

one or more processors;

memory for storing one or more programs, wherein the one or more processors are configured to execute at a first storage sub-system the one or more programs including instructions for:

receiving from a client a first client request for an object that is not present in the first storage sub-system;

identifying a second storage sub-system as having a replica of the requested object, wherein the requested object includes content and metadata;

submitting an object replication request for the requested object to the second storage sub-system, further comprising:

receiving metadata of the requested object from a metadata management component of the second storage sub-system, wherein the metadata includes an extents table of the requested object;

identifying a location of the object content at the second storage sub-system using the extents table;

independently receiving the content and metadata of the requested object from the second storage sub-system;

generating a new replica of the object at the first storage sub-system using the received metadata and content; and returning the metadata of the new replica of the object to the client.

11. The computer system of claim 10, further comprising:
instructions for extracting an object ID of the requested object from the first client request;
instructions for querying a metadata table of the first storage sub-system using the object ID; and
instructions for determining whether the object is present in the first storage sub-system in accordance with the query result.

12. The computer system of claim 10, wherein the instructions for identifying a second storage sub-system further comprise:

instructions for sending a query for the requested object to a third storage sub-system, wherein the third storage sub-system includes metadata of objects stored at the plurality of storage sub-systems; and instructions for receiving a response from the third storage sub-system, wherein the response identifies the second storage sub-system as source and a chunk store within the first storage sub-system as destination.

13. The computer system of claim 10, wherein the instructions for submitting an object replication request for the requested object to the second storage sub-system further comprise:

instructions for submitting a content replication request to a content management component of the second storage sub-system, wherein the content replication request includes the identified content location of the requested object.

14. The computer system of claim 13, wherein the content replication request is given a priority higher than other content replication requests that are not triggered by a real-time client request.

15. The computer system of claim 13, further comprising:
instructions for generating a metadata entry for the object in a metadata table of the first storage sub-system using the metadata of the requested object received from the second storage sub-system;

instructions for inserting the received metadata into the newly-generated metadata entry of the metadata table;

instructions for setting an object state attribute in the newly-generated metadata entry as "uploading;" and instructions for returning the newly-generated metadata entry to the requesting client.

16. The computer system of claim 15, wherein the object content includes one or more chunks, further comprising:

instructions for receiving from the client a second client request for accessing a client-specified portion of the object;

for a respective chunk received from the second storage system, instructions for returning the chunk to the requesting client if the chunk overlaps with the client-specified portion of the object;

instructions for storing a replica of the chunk within the first storage sub-system; and instructions for updating the metadata entry in the first storage sub-system to reflect the presence of the chunk within the first storage sub-system.

17. The computer system of claim 16, wherein the instructions for updating the metadata entry in the first storage sub-system further comprise:

instructions for generating a metadata update for the chunk, wherein the metadata update includes location information of the chunk within the first storage sub-system;

instructions for updating an extents table of the metadata entry using the location information of the chunk;

instructions for updating the object state attribute of the metadata entry to be "finalized" if the plurality of chunks of the object are located within one chunk store of the first storage sub-system; and instructions for updating the object state attribute of the metadata entry to be "finalizing" if the plurality of chunks of the object are located within multiple chunk stores of the first storage sub-system.

18. The computer system of claim 17, further comprising:
instructions for moving the plurality of chunks from the multiple chunk stores of the first storage sub-system to a destination chunk store of the first storage sub-system; and instructions for updating the object state attribute of the metadata entry to be "finalized" if the plurality of chunks of the object are located within the destination chunk store of the first storage sub-system.

19. A non-transitory computer readable storage medium storing one or more programs configured for execution by a first storage sub-system having one or more processors and memory storing one or more programs for execution by the one or more processors in association with a distributed storage system that includes a plurality of storage sub-systems, the one or more programs comprising instructions for:
- receiving from a client a first client request for an object that is not present in the first storage sub-system;
- identifying a second storage sub-system as having a replica of the requested object, wherein the requested object includes content and metadata;
- submitting an object replication request for the requested object to the second storage sub-system, further comprising:
  - receiving metadata of the requested object from the metadata management component of the second storage sub-system, wherein the metadata includes an extents table of the requested object;
  - identifying a location of the object content at the second storage sub-system using the extents table;
- independently receiving the content and metadata of the requested object from the second storage sub-system;
- generating a new replica of the object at the first storage sub-system using the received metadata and content; and
- returning the metadata of the new replica of the object to the client.

20. The computer readable storage medium of claim 19, further comprising instructions for:
- upon receipt of the first client request,
  - extracting an object ID of the requested object from the first client request;
  - querying a metadata table of the first storage sub-system using the object ID; and
  - determining whether the object is present in the first storage sub-system in accordance with the query result.

* * * * *